March 19, 1929.  S. W. KENDALL  1,706,301
PROCESS FOR THE MANUFACTURE OF WHITE LEAD PIGMENT
Filed Sept. 24, 1924   4 Sheets-Sheet 1

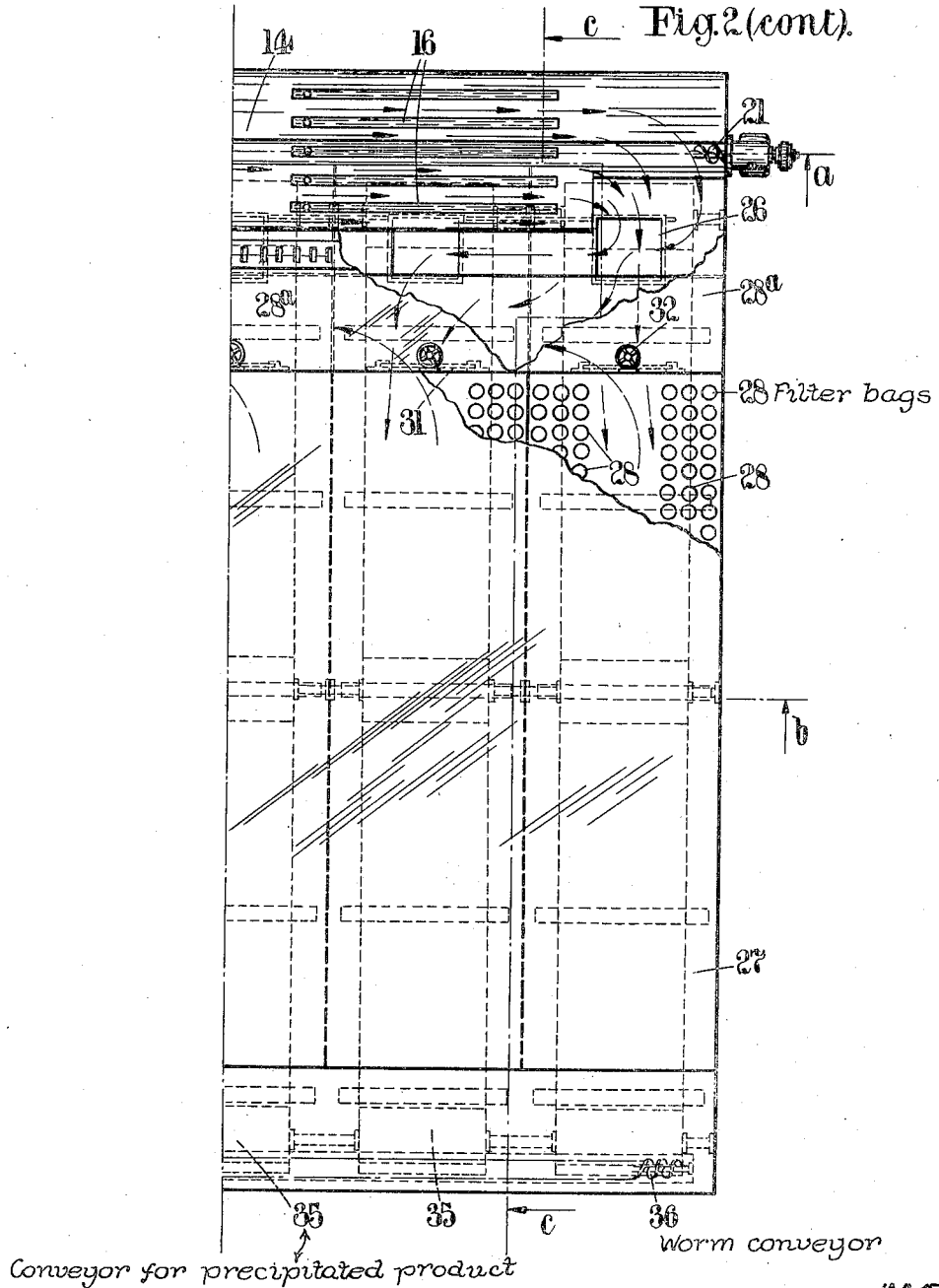

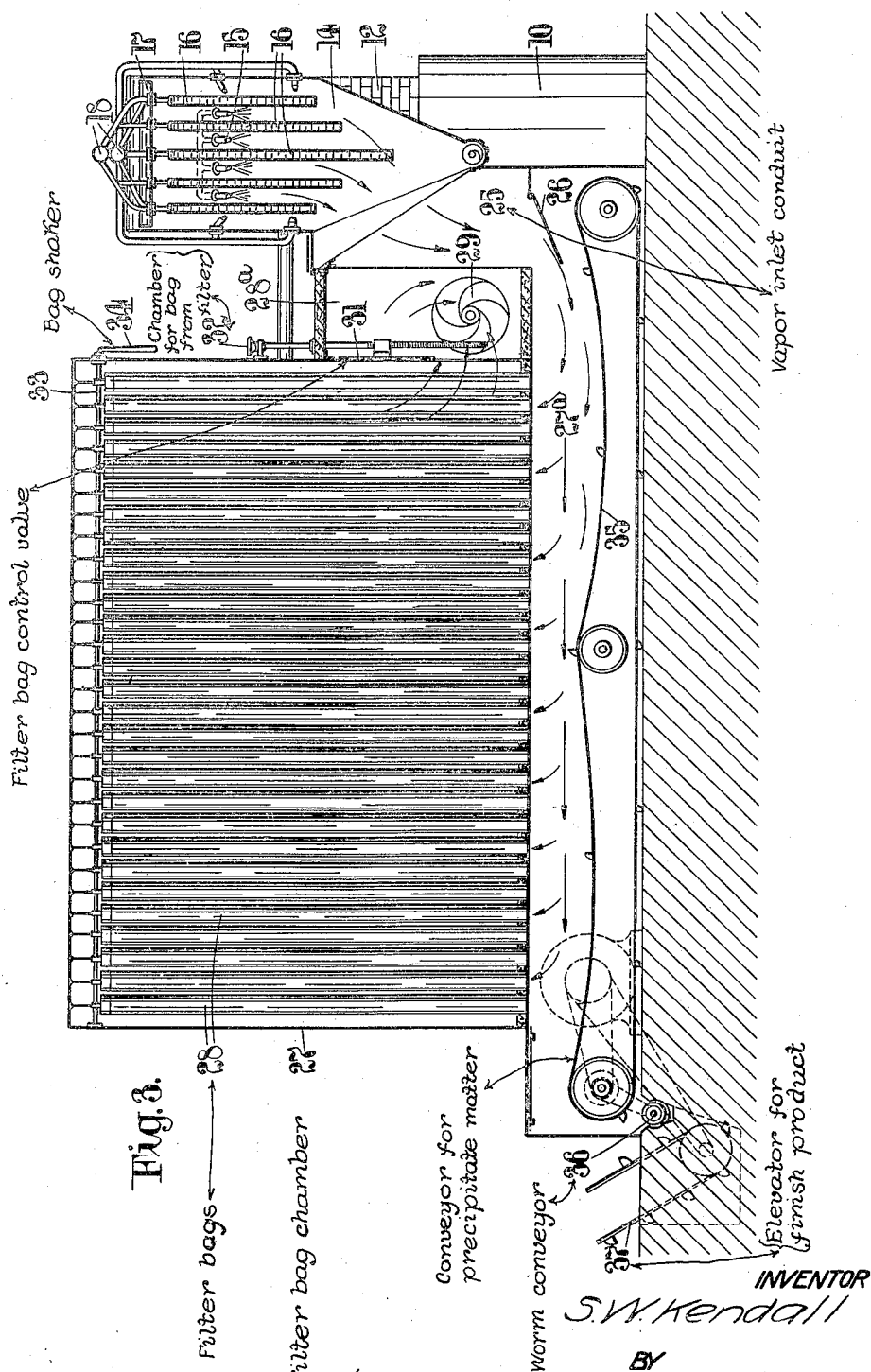

Patented Mar. 19, 1929.

1,706,301

UNITED STATES PATENT OFFICE.

SYDNEY WILMER KENDALL, OF WESTMINSTER, LONDON, ENGLAND.

PROCESS FOR THE MANUFACTURE OF WHITE-LEAD PIGMENT.

Application filed September 24, 1924. Serial No. 739,695.

This invention has reference to the production of pigments from sulphide ores. The chief object of my invention is to provide an improved process of and apparatus for producing a substantially non-poisonous sulphate white-lead pigment of great purity and fineness and of improved color directly from galena and other sulphide ores including ores which are too refractory or too poor for commercial utilization, but I wish it to be understood that my invention may be utilized for the production of pigments from other sulphide ores such as will volatilize at or under the maximum temperature attainable by drawing or forcing air through a glowing coke bed, and the terms sulphide ores and sulphides in the ensuing description and claims are to be construed with such limitation.

My improved process in its broadest aspect consists in treating the ore in an appropriate furnace to vaporize the sulphides oxidizing the sulphide vapors to convert them into sulphates chilling the sulphate vapors immediately oxidation is complete by commingling them with atomized fluid and cooling and separating the condensed sulphates by filtration.

More specifically regarded my improved process consists in feeding the ore direct from the concentration plant to a bed of live coke in a furnace while maintaining the fuel bed at a depth sufficient to continue a reducing action whereby the sulphides are vaporized without oxidation thereof, submitting the vaporized sulphides to air sufficient in quantity to oxidize the sulphides and maintain an oxidizing atmosphere, then immediately cooling and quenching the oxidized vapors or " fume " below their dissociating temperature by atomized fluid injected thereinto and subjecting the fume and the gases of combustion to a further cooling operation whereby the temperature is reduced to a degree enabling the fume to be filtered to separate the condensed sulphates from the gases of combustion.

A further feature of my improved process consists in treating the vapors from the ore or the " fume " in its cooled condition with reagents in the form of vapor or spray whereby the chemical composition or the color of the final product may be varied.

In the accompanying drawings I have illustrated diagrammatically apparatus suitable for carrying my improved process into practical effect and in which like reference numerals indicate corresponding parts in the several views.

Figure 2 illustrates a plan view of the complete apparatus parts being shown in section and Figure 3 is a longitudinal section on line $c$—$c$ of Figure 2.

Figure 1:
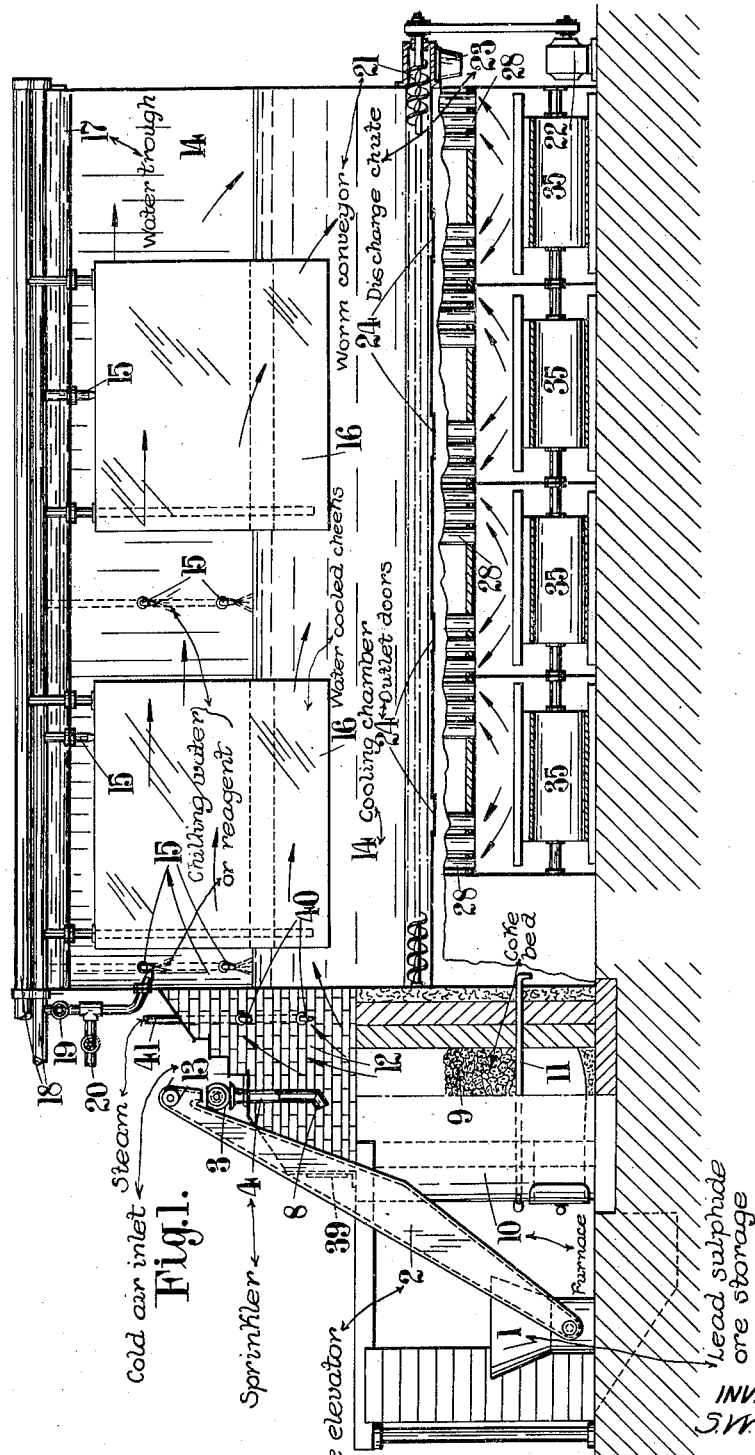
Figure 1 represents a vertical longitudinal section taken on the irregular line $a$—$a$ of Figure 2 the lower part of the figure however being a sectional elevation on line $b$—$b$ of Figure 2.

Galena or other sulphide ores direct from the concentration plant are fed in measured quantities from the ore storage 1 (Figs. 1 and 2) by means of an elevator 2 to the worm conveyor 3 and thence conducted to a sprinkler 4 deriving rotary motion through the bevel gearing 5 driven by the motor 6 through the worm conveyor 3 said motor 6 also being utilized to drive the elevator 2 through the belt or chain 7. The sprinkler 4 is provided as shown with an angularly arranged spout 8 serving to distribute evenly the ore over the coke bed 9 in the cylindrical furnace 10. The coke bed 9 is supported on water-cooled fire bars 11 spaced preferably at a relatively large distance apart as for example of from 3 to 5 inches.

The sulphide vapors arising from the ore on the coke bed pass into an oxidizing or combustion chamber 12 where they are met by evenly distributed streams of cold air entering through adjustable damper plates 13 in the roof of the chamber 12 in sufficient quantity to oxidize the sulphide vapors to sulphate and maintain an oxidizing atmosphere.

It is essential that immediately after oxidation the oxidized vapors should be cooled below their dissociation temperature and to accomplish this I pass the oxidized vapors immediately to the cooling chamber 14 (being drawn therethrough by a suction device to be presently referred to) where they are quickly quenched or chilled by water or other fluid injected into said chamber 14 by means of atomizers 15 arranged in suitable positions within the cooling chamber thus condensing said vapors wholly or in part in the form of lead sulphate compound. Only such quantities of water or other fluid are introduced as will be completely vaporized by direct contact with the hot gases which are cooled by the heat interchange. The condensed vapors and the gases of combustion now pass between and around a plurality of water cooled cheeks 16 the disposition of which will be seen more clearly on reference to Fig. 3 whereby they are cooled to a temperature enabling them to be filtered without detrimentally affecting the filtering material. The cooling chamber 14 is preferably provided at the top with a water trough 17 to assist in cooling said chamber and the water mains 18 serve to supply water to the atomizers 15. These atomizers 15 may also be employed for introducing reagents in vapor or spray form into the chamber 14 and are each provided with a valve or cock 19 (see the top left hand portion of Fig. 1) whereby supply of water from main 18 may be interrupted when desired and appropriate reagents introduced through the valve controlled pipe connection 20.

The object of rapidly cooling the vapors by quenching with fluid is to obviate the danger of colored oxides being freed due to dissociation consequent on continued heating which would detrimentally affect the color of the product and also to prevent fineness of the precipitated particles of sulphate being impaired by coalescence and by condensation of warmer vapors on the solid particles already formed. The bottom of the cooling chamber 14 is of hopper like formation (Fig. 1) having a worm conveyor 21 located therein driven by a motor 22 and a discharge chute 23 arranged exterior of the chamber 14. The bottom of the hopper is also provided with doors 24 at appropriate distances apart. Some of the condensed sulphate will deposit in the bottom of the hopper and should there be any tendency for the precipitated material to vary in composition or quality it will generally be found that the poorer material will be dropped first near the furnace. The conveyor 21 discharge chute 23 and doors 24 may thus be employed to discharge the low grade material before it can pass into the main collecting chamber together with the high quality precipitate and this low grade material may be returned to the furnace together with the fresh portions of ore for further treatment if so desired.

The fume consisting of finely divided particles of lead sulphate compound and gases of combustion also vapor reagents if used now pass from the end of the cooling chamber 14 into a conduit 25 through apertures in the floor of said conduit 25 adapted to be regulated by valves or doors 26 into the space 27ª below the filter bag chamber 27 as indicated by the arrows in Figs. 2 and 3 and thence upward into the filter bags 28, which may be of flannel or other suitable filtering material, where the solid material is filtered out remaining on the inside of the bags while the gases pass through the bags into the chamber 27 and thence into a chamber or conduit 28ª connected to the suction side of the fan 29 driven by the motor 30.

Figure 2:
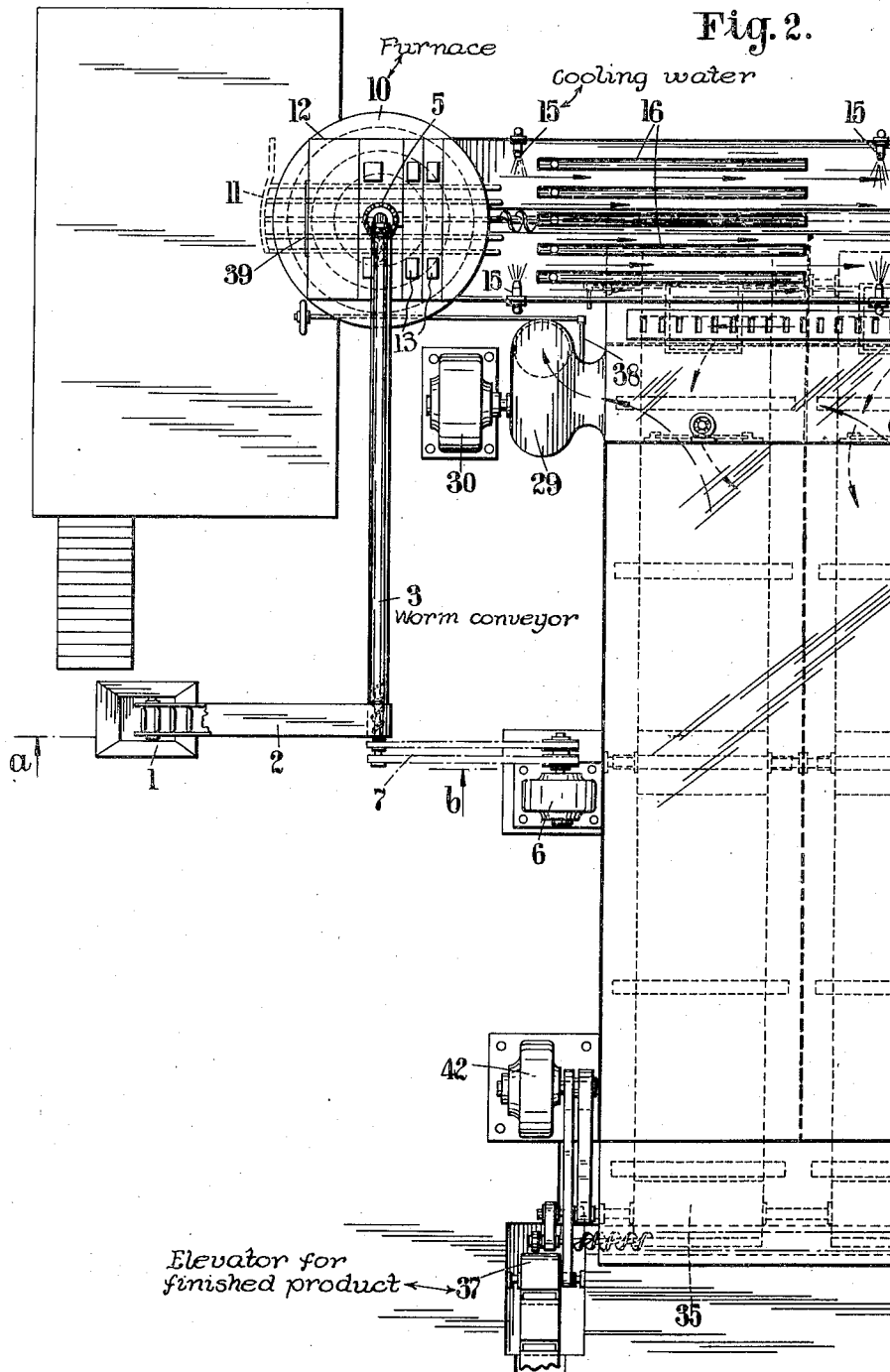

The filter chamber may be divided into any desired number of sections; in Fig. 2 I have shown four such sections each of which is provided with a valve 31 operated externally of the chamber 28 by the hand wheel 32 whereby any one or more sections may be cut out of the filter chamber without interfering with the continuous operation of the plant. The bags 28 are open at their lower ends and are supported at the top by bars 33 adapted for operation as by the handle 34 to shake them to cause the precipitated lead sulphate compound to drop into the lower portion 27ª of the filter chamber 27 wherein is located scraper conveyors 35 which convey the finished product to a cross worm conveyor 36 whereby it is fed to the elevator 37 which conveys it to a suitable place for packing. A motor 42 serves to drive both the conveyors 35 and 36 and also the elevator 37.

The quality of the product produced in the manner described largely depends upon the correct management of the furnace as to air supply. The volatilization of the sulphides depends upon the temperature of the coke bed and this again upon the amount of air supplied to the coke. The oxidation of the sulphide vapors depends upon the amount of cold air entering the combustion or oxidizing chamber 12 through the adjustable damper plates 13 in the roof thereof, care however must be exercised that too much cold air is not introduced into the chamber 12 as otherwise the vapors may be excessively chilled before they have become completely oxidized. Both of these conditions are dependent upon the suction fan 29 which draws the vapors or fume and other products of combustion through the apparatus to the filter bags 28. Once adjustment of the damper plates 13 is properly determined this adjustment is practically constant and all variations are made by increasing or decreasing the draught created by the suction fan 29 either by means of a damper 38 or by regulating the speed of said fan through the motor 30.

The furnace operator can thus maintain proper control of the supply of air for volatilizing, oxidizing, and cooling in spite of variations in the draught caused by opening and closing of doors or dampers while the product is being removed from the filter bags or at other stages of the process or by variations caused by the opening of the coke feeding door 39 or other causes.

An extremely important feature of my invention resides in the means whereby the chemical composition or physical characteristics of the final product may be varied by the use of appropriate reagents injected into the vapors during their passage through the combustion or oxidizing chamber 12 and/or during their passage through the cooling chamber 14. The reagents may be introduced in a gaseous condition or in the form of liquid atomized by the atomizers 15 at the exact point or temperature where the most effective reaction will occur so as to ensure a reaction or mixture of the reagents with the fume in proper proportions, a result which it is difficult or impracticable to attain once the precipitate has been formed or has collected in mass.

In the treatment of lead ores for example the final product obtained by the process and apparatus hereinbefore described has the approximate composition $(PbSO_4)_x.PbO$, a basic sulphate (where X may be any number from 2 to 15 depending upon operating conditions) and by regulating the quantities of reagent such as sulphuric acid vapor the basic sulphate may be varied in chemical composition even to producing an absolutely neutral lead sulphate $PbSO_4$.

As a further example of the introduction of reagents or chemicals, actual coatings of color may be applied to produce definite tints or colors on a basis or kernel of lead sulphate compound, a product analogous to a precipitated lake on a lead base being obtained or again the apparent whiteness of the pigment or the brightness and covering power thereof may be improved by introducing through the atomizers 15 at the appropriate point or temperature a colloidal or finely ground water suspension of ultramarine blue thus giving every particle of the pigment an evenly distributed tint.

As above stated the chemical reagents or the colors may be applied through the atomizers 15, but I also contemplate the introduction of such reagents or coloring matter through separate atomizers and in some cases it may be advisable to introduce them directly into the combustion or oxidizing chamber 12 depending upon the particular reagent employed and the result it is desired finally to attain.

The introduction of steam or superheated steam into the combustion or oxidizing chamber 12 tends to prevent the formation of sulphites which are highly undesirable in a white lead and I therefore contemplate such introduction by providing one or more nozzles 40 in the wall of the chamber 12 adapted to be connected by means of the pipe 41 with a source of steam supply.

In the operation of my improved process and apparatus any silver or gold either in the metallic form or as compounds of these metals in the crude ore is recovered, the gold and silver being reduced by contact with the glowing coke with a small quantity of metallic lead which dissolves the gold and silver and drops down through the fuel bed and collects beneath the hearth of the furnace with the slag and ash from which the metallic ingredients may be recovered by appropriate methods.

Under my invention I am enabled to produce a white lead pigment having an approximate composition of $(PbSO_4)_{14}.PbO$. Such a pigment is for all commercial purposes relatively nonpoisonous as except in many strong acids its solubility is approximately under 5%.

The plant is compact and occupies a minimum of space and the operation is continuous, no interruption of operation being necessary at any stage of the process, while the final product is in a state of such fine subdivision that further treatment is unnecessary to render it fit for use.

While I have described the preferred construction of apparatus and the process of manufacturing white lead pigments I am aware that numerous changes in construction and operation may be made without departing from the spirit of my invention as expressed in the appended claims.

What I claim is:—

1. The process of producing pigment from sulphide ores which consists in heating the ores in a reducing atmosphere to vaporize the sulphides without oxidation, oxidizing the sulphide vapors to convert them into sulphates, chilling the sulphate vapors, immediately oxidation is complete by atomized liquid injected in limited quantity such that it becomes completely vaporized and cooling and separating the precipitated sulphates from the products of combustion by filtration.

2. The process of producing pigment from sulphide ores which consists in heating the ores to vaporize the sulphides without causing oxidation thereof, oxidizing the sulphide vapors by means of air to convert them into sulphates, then immediately chilling the vapors rapidly by admixture with atomized liquid in limited quantity such that it becomes completely vaporized and cooling and separating the precipitated sulphates from the products of combustion by filtration.

3. The process of producing pigment from sulphide ores which consists in feeding the ore to a bed of live fuel maintained at a temperature sufficient to vaporize the sulphides without causing oxidation thereof, submitting the vaporized sulphides to air in sufficient quantity to maintain an oxidizing atmosphere, cooling and quenching the oxidized vapor or fume below their dissociating temperature by atomized fluid injected thereinto, subjecting the fume and the gases of combustion to a further cooling operation whereby they are reduced to a temperature enabling the fume to be filtered, filtering the sulphates from the gases of combustion and collecting the filtrate.

4. In the process of manufacturing pigment from sulphide ores the step in the process which consists in quenching the oxidized fume by liquid water atomized thereinto in limited quantity such that it becomes completely vaporized.

5. The process of producing basic lead sulphate from sulphide ores which consists in heating the ores in a reducing atmosphere to vaporize the sulphides without oxidation, oxidizing the sulphide vapours to convert them into sulphate, chilling the sulphate vapours, immediately oxidation is complete, by atomized fluid injected in limited quantity such that it becomes completely vaporized, and cooling and separating the precipitated sulphates from the products of combustion by filtration; the character of the basic lead sulphate being modified by spraying with reagent during low temperature conditions and after oxidation.

6. The process of producing basic lead sulphate from sulphide ores which consists in heating the ores in a reducing atmosphere to vaporize the sulphides without oxidation, oxidizing the sulphide vapours to convert them into sulphate, chilling the sulphate vapours immediately oxidation is complete, by atomized fluid injected in limited quantity such that it becomes completely vaporized, and cooling and separating the precipitated sulphates from the products of combustion by filtration; the character of the basic lead sulphate being modified by spraying with sulphuric acid during low temperature conditions and after oxidation.

7. The process of producing lead sulphate from sulphide ores which consists in heating the ores in a reducing atmosphere to vaporize the sulphides without oxidation, oxidizing the sulphide vapours to convert them into sulphate, chilling the sulphate vapours immediately oxidation is complete by atomized fluid injected in limited quantity such that it becomes completely vaporized, spraying with reagents capable of modifying the character of the sulphate, and cooling and separating the precipitated sulphate from the products of combustion by filtration.

8. In the process of manufacturing basic lead sulphate pigment from sulphide ores, the step in the process which consists in quenching the oxidized fume by water atomized thereinto in limited quantity such that it becomes completely vaporized and incorporating with the atomized water a reagent capable of modifying the character of the precipitated sulphate.

SYDNEY WILMER KENDALL.